(12) United States Patent
Corella

(10) Patent No.: US 6,802,002 B1
(45) Date of Patent: Oct. 5, 2004

(54) METHOD AND APPARATUS FOR PROVIDING FIELD CONFIDENTIALITY IN DIGITAL CERTIFICATES

(75) Inventor: Francisco Corella, Hayward, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/483,189

(22) Filed: Jan. 14, 2000

(51) Int. Cl.[7] .................................................. H04L 9/00
(52) U.S. Cl. ..................... 713/175; 713/155; 713/156; 713/157; 713/158; 713/159
(58) Field of Search ................................. 713/155, 156, 713/157, 158, 159, 175; 705/76

(56) References Cited

U.S. PATENT DOCUMENTS

| | | | |
|---|---|---|---|
| 4,881,264 A | 11/1989 | Merkle | |
| 5,029,150 A | 7/1991 | Kiyoshi | 369/44.25 |
| 5,210,795 A | 5/1993 | Lipner et al. | 713/187 |
| 5,224,163 A | 6/1993 | Gasser et al. | 380/30 |
| 5,276,901 A | 1/1994 | Howell et al. | 707/9 |
| 5,793,868 A | 8/1998 | Micali | 380/28 |
| 5,796,841 A * | 8/1998 | Cordery et al. | 380/55 |
| 5,996,076 A | 11/1999 | Rowney et al. | 713/201 |
| 6,023,506 A * | 2/2000 | Ote et al. | 713/165 |
| 6,044,462 A * | 3/2000 | Zubeldia et al. | 713/158 |
| 6,058,484 A | 5/2000 | Chapman et al. | 713/202 |
| 6,092,201 A * | 7/2000 | Turnbull et al. | 713/201 |
| 6,202,151 B1 * | 3/2001 | Musgrave et al. | 713/186 |
| 6,212,636 B1 | 4/2001 | Boyle et al. | 713/168 |
| 6,253,322 B1 * | 6/2001 | Susaki et al. | 713/170 |
| 6,263,446 B1 | 7/2001 | Kausik et al. | 713/201 |
| 6,324,645 B1 | 11/2001 | Andrews et al. | 713/157 |
| 6,327,578 B1 * | 12/2001 | Linehan | 705/65 |
| 6,393,563 B1 | 5/2002 | Maruyama et al. | 713/155 |
| 6,484,259 B1 * | 11/2002 | Barlow | 713/159 |
| 2002/0143710 A1 * | 10/2002 | Liu | 705/75 |

FOREIGN PATENT DOCUMENTS

| | | |
|---|---|---|
| WO | WO 99/35783 | 7/1999 |
| WO | WO 01/43344 | 6/2001 |

OTHER PUBLICATIONS

Foster, Ian. A Security Architecture for Computational Grids. ACM. San Fransisco CA, 1998.*

Wheeler, Lynn. Three Digital Signature Models . . . for x9.59. Nov. 28, 1997.*

Stephen Cobb. Network World. Framingham: Jul. 7, 1997. Vol. 14, Iss. 27; p. 53, 3 pgs.*

Encryption Plus Folders. Encryption Plus Folders Enterprise. 2002.*

(List continued on next page.)

Primary Examiner—Ayaz Sheikh
Assistant Examiner—Ali Mashaal

(57) ABSTRACT

A structured digital certificate is adapted to be certified by a digital signature of a certificate authority in an unprotected form, a first protected form, and a second protected form of the digital certificate. The digital certificate includes a first type field of authorization information relevant to a first recipient and being readable in the unprotected form and the first protected form of the digital certificate, and a first cryptographic folder containing a second type field of authorization information relevant to a second recipient and being readable in the unprotected form and the second protected form of the digital certificate, but not readable in the first protected form of the digital certificate. The digital certificate is configured to permit the subject to convert the structured digital certificate from the unprotected form to at least one of the first protected form and the second protected form. The digital certificate is convertible into the first protected form to permit the first recipient to authorize the subject of the structured digital certificate, into the second protected form to permit the second recipient to authorize the subject of the structured digital certificate.

27 Claims, 10 Drawing Sheets

OTHER PUBLICATIONS

Moeller, Michael. Digital IDs : offering expanded view of users : Verisign's next Digital certificates extend electronic ID's to include personal Data. PC Week. Ziff–Davis Publishing Co. Feb. 3, 1997.*

M. Boe et al., "TLS–Based Telnet Security," Internet Engineering Task Force, Internet Draft, pp. 1–20, (Updated Version Oct. 24, 2000, Previous Version Sep. 1998). <http://www.normos.org/ietf/draft/draft–ietf–tn3270e–telnet–tls–05.txt>.

D. Borman, "Telnet Authentication Option," Network Working Group, Request for Comments: 1416, pp. 1–7, (Feb. 1993). <http://www/csl.sony.co.jp/rfc/>.

M. Carpenter et al., "Securing FTP with TLS," Internet Engineering Task Force, Internet Draft, pp. 1–23, (Jan. 28, 1998). <http://war.jgaa.com/ftp/draft/draft–murray–auth–ftp– ssl–03.txt>.

C. Ellison et al., "SPKI Certificate Theory," Network Working Group, Request for Comments: 2693, pp. 1–43, (Updated Version Sep. 1999, Previous Version Nov. 17, 1998). <http://www.csl.sony.co.jp/rfc/>.

S. Farrell, "TLS Extensions for AttributeCertificate Based Authorization," Transport Layer Security Working Group, Internet Engineering Task Force, Internet Draft, pp. 1–11, (Aug. 20, 1998). <http://www. alternic.org/draft/draft–ietf–tls–attr–cert–01.txt>.

M. Horow itz et al., "FTP Security Extensions," Netw orking Working Group, Request for Comments: 2228, pp. 1–27, (Oct. 1997). <http://www.csl.sony.co.jp/rfc/>.

R. Housley et al., "FTP Authentication Using DSA," CAT Working Group, Internet Engineering Task Force, Internet Draft, pp. 1–8, (Feb. 1998). <http://www.alternic.org/draft/draft/ieft–cat–ftpdsaauth–02.txt>.

R. Housley et al., "Telnet Authentication Using DSA," Secure Telnet Working Group, Internet Engineering Task Force, Internet Draft, 7 pages, (Jul. 1998). <http://www.alternic.org/draft/draft/housley–telnet–auth–dsa–02.txt.

J. Kohl et al., "The Kerberos Netw ork Authentication Service (V5)," Network Working Group, Request for Comments: 1510, pp. 1–112, (Sep. 1993). <http://www.csl.sony.co.jp/rfc/>.

S. Micali, "Efficient Certificate Revocation," Massachusetts Institute of Technology, Laboratory for Computer Science, pp. 1–10 (Mar. 22, 1996).

M. Myers et al., "X.509 Internet Public Key Infrastructure Online Certificate Status Protocol–OCSP," Netw ork W orking Group, Request for Comments: 2560, pp. 1–22, (Jun. 1999). <http://www.csl.sony.co.jp/rfc/>.

M. Naor et al., "Certificate Revocation and Certificate Update," USENIX Association, Seventh USENIX Security Symposium, pp. 217–228, (Jan. 26–29, 1998).

C. New man, "Telnet SASL Option," Network Working Group, Internet Engineering Task Force, Internet Draft, 6 pages, (Nov. 1998). <http://globecom.net/ieft/draft/draft–new man–telent–sasl–01.html>.

E. Rescorla, "HTTP Over TLS," Internet Engineering Task Force, Internet Draft, pp. 1–6, (Sep. 1998). <http://www.alternic.org/draft/draft–ietf–tls–https–02.txt>.

RSA Security Inc., "RSA Keon A dvanced PKI: A Security Architecture for Enabling E–Business," Solution White Paper, pp. 1–14, (1999). <http://www.rsasecurity.com/products/keon/w hitepapers/adv pkiw p/rsa_keon_advanced_pki_w p.pdf>.

RSA Security Inc., "Security Services Provided by the RSA Keon Desktop v5.1," White Paper, pp. 1–8, (1999). <http://www.rsasecurity.com/products/keon/w hitepapers/desktop/keon_desktop_w p.pdf>.

B. Tung et al., "Public Key Cryptography for Initial Authentication in Kerberos," Internet Engineering Task Force, Internet Draft, 21 pages (Expires May 15, 1999) <http://www .alternic.org/draft/draft–ietf–cat–kerberos–pk–init–07.txt>.

Web Page of the "Simple Public Key Infrastructure (spki)," W orking Group, 2 pages, (Last Modified Jan. 16, 2001), <http://www.ietf.org/html.charters/spki–charter.html>.

Web Page of the "Transport Layer Security (tls)," Working Group, 2 pages, (Last Modified Mar. 30, 2001), <http://www.ietf.org/html.charters/tls–charters.html>.

International Telecommunication Union (ITU–T) Recommendation X.509, "Information Technology Open Systems Interconnection, The Directory: Authentication Framework," pp. i–81 (Jun. 1997).

Press, Jim, "Secure Transfer of Identity and Privilege Attributes in an Open Systems Environment," Computers & Security, vol. 10, No. 2., pps. 117–127, (Apr. 1991).

"SET Secure Electronic Transaction Specification," Book 1: Business Description, Version 1.0, XP–002203148, pps. i–72, (May 31, 1997).

A partial copy of European Search Report for Application No. EP 00 31 0771 mailed on Jul. 12, 2002 (4 pages).

R. Rivest, "Can We Eliminate Certificate Revocation Lists?," MIT Laboratory for Computer Science, pp. 178–183, (Feb. 1998). <http://theory.lcs.mit.edu/rivest>.

Menezes, "Handbook of Applied Cryptography," pps. 33, 37–39, 321–322, 559–560, 576–577, (1997).

A copy of PCT International Search Report for International Application No. PCT/US01/01520 mailed on Aug. 10, 2001 (8 pages).

* cited by examiner

METHOD AND APPARATUS FOR PROVIDING FIELD CONFIDENTIALITY IN DIGITAL CERTIFICATES

This patent application is related to the following Non-Provisional U.S. patent applications: Ser. No. 09/483,185, entitled "AUTHORIZATION INFRASTRUCTURE BASED ON PUBLIC KEY CRYPTOGRAPHY," Ser. No. 09/483,356, entitled "LIGHTWEIGHT PUBLIC KEY INFRASTRUCTURE EMPLOYING DISPOSABLE CERTIFICATES," and Ser. No. 09/483,186, entitled "LIGHTWEIGHT PUBLIC KEY INFRASTRUCTURE EMPLOYING UNSIGNED CERTIFICATES," and the following Provisional U.S. Patent Application Serial. No. 09/759,443, entitled "PUBLIC KEY VALIDATION SERVICE," which are all filed on even date herewith, are all assigned to the same assignee as the present application, and are all herein incorporated by reference.

THE FIELD OF THE INVENTION

The present invention relates to verifying an entity's identity and/or capabilities on a data network, and more particularly, to an apparatus and method for using hierarchically structured digital certificates containing authorization information to verify the identity and/or capabilities of an entity on a data network.

BACKGROUND OF THE INVENTION

In everyday life, trust is granted between individuals based on characteristics defining the relationship of the individuals and the identity of the individual in question, such as familiarity, occupation, status, and third party voucher of the individual in question. However, trust between individuals communicating on a public internet is not typically granted in such a simple and straightforward manner, because individuals can assume almost any identity in cyberspace. While the public internet offers flexibility and freedom, the public internet also instills high levels of distrust, especially when granting authority to an individual or when transmitting private, sensitive, or confidential information.

On the public internet, a digital certificate is typically used to verify the identity and/or capabilities of a subject or sender of the digital certificate presented to a recipient or relying party of the digital certificate. A third party, referred to as a certificate authority or issuer of the digital certificate, researches the subject/sender desiring certification, and issues a digital certificate to the subject/sender to vouch that the subject/sender of the message is actually who they say they are. The certificate authority digitally signs the digital certificate. The subject of the digital certificate presents the signed digital certificate to the relying party who trusts the certificate authority. The relying party computes a cryptographic hash of contents of the digital certificate and uses the cryptographic hash together with a certificate authority's public key, which is readily available, to verify the digital signature. The verification of the digital signature verifies that the digital certificate was issued by the certificate authority.

Basic public key digital certificates contain a public key and a name associated with the sender. Extended public key certificates typically contain additional fields of authorization information not found in the basic public key certificates. Authorization certificates omit the name, and bind the public key directly to authorization information. Attribute certificates omit the public key, and bind the name to authorization information.

Currently, the leading digital certificate standard is X.509 version 3 (X.509v3). The X.509v3 standard is an extended public key certificate standard, which can contain additional fields of authorization information not found in the basic public key certificates. The X.509v3 standard supports Secure Sockets Layer 3.0 encryption along with other encryption schemes. Both Netscape Communicator 4.0 and Microsoft's Internet Explorer 4.0 support X509v3 certificates.

In X.509v3 digital certificates, each extension field has a criticality flag. The criticality flag is employed in situations where the recipient of a digital certificate is presented with one or more extension fields within the digital certificate that the recipient does not understand, perhaps because the extension field is newer than the computer program used by the recipient. If the criticality flag is not set, the recipient can ignore the unknown extension field. If the criticality flag is set, the relying party must reject the digital certificate.

In certain situations, it is convenient to collect information intended for multiple uses in the same digital certificate by using two or more unrelated fields within the digital certificate. This approach provides the simplicity of a single digital certificate for a wide variety of authentication and authorization needs. This approach, however, compromises confidentiality since all recipients have access to all fields, related or unrelated to the recipient's requirements. For example, a single digital certificate may grant access to a Unix platform and also grant permission to sign purchase orders. In this example, the digital certificate has first type fields that specify a user ID and group ID for the Unix platform, as well as second type fields that specify a limit on the value of purchase orders that the recipient of the digital certificate is authorized to sign. Thus, when the digital certificate is used to access the Unix platform, the second type fields (i.e., the purchase order limit) are unrelated to the recipient's requirements and may become visible to the Unix administrator, such as by being recorded on the system log. The Unix administrator has no need to know the limit on the value of purchase orders, and it would be best if this purchase order information were not disclosed unnecessarily.

Alternative approaches have been developed to work around the confidentiality problem that results from two or more unrelated fields residing within the same digital certificate. In a first alternative approach, confidentiality is achieved by encrypting some or all of the fields of the digital certificate. The first alternative approach only provides protection against a third party that eavesdrops on the transmission of the digital certificate to the relying party. This first alternative approach cannot provide confidentiality against the recipient itself, because the recipient needs access to the plaintext of the entire digital certificate in order to compute a cryptographic hash necessary to validate the digital certificate.

In a second alternative approach, the sender uses separate digital certificates instead of placing information in multiple, unrelated fields within a single digital certificate. For example, instead of using one digital certificate containing the public key and the name of the sender together with three types of fields containing authorization information for three unrelated applications, the second alternative approach uses four separate digital certificates. The four separate digital certificates include a first basic public key certificate binding the public key to the sender name, and three attribute certificates. Each attribute certificate binds the sender name to the corresponding authorization information contained in the field type of the given attribute certificate. This second alternative approach has an advantage in that the four digital certificates can be signed by four independent certificate authorities. On the other hand, the second alternative approach has the disadvantage in that it requires four digital signatures instead of one, and four transactions over a network instead of one when the certificate authority issues the digital certificate to the subject. Thus, the second approach is more computationally expensive and results in more network traffic than the certificate authority issuing a single digital certificate to the subject.

For reasons stated above and for other reasons presented in greater detail in the Description of the Preferred Embodiments section of the present specification, there is a need for an improved type of digital certificate and corresponding improved methods of employing the digital certificate so that when the sender of a digital certificate presents the digital certificate to the recipient of the digital certificate for a given purpose, only those fields of the digital certificate that have to be inspected by the recipient are revealed to the recipient. The desired digital certificate should provide this recipient confidentiality protection without the added computational and network traffic overhead resulting from issuing multiple digital certificates.

SUMMARY OF THE INVENTION

The present invention provides a structured digital certificate for enabling a first recipient of the structured digital certificate to authorize a sender of the structured digital certificate. The structured digital certificate includes a first type field of authorization information relevant to the first recipient and readable by the first recipient. The structured digital certificate includes a first cryptographic folder containing a second type field of authorization information relevant to a second recipient. The second type field of authorization information is not readable by the first recipient.

In one embodiment, the structured digital certificate includes a second cryptographic folder containing the first type field. In one embodiment, the first type field is not contained in a folder. In one embodiment, there are multiple first type fields in the structured digital certificate.

In one embodiment, the structured digital certificate includes a sender name and a public key associated with the sender.

In one embodiment of the present invention, the cryptographic folders of authorization information are structured fields, containing a plurality of nested fields. Each of the plurality of nested fields can be a folder itself. In one embodiment, the digital certificate is an X.509v3 digital certificate. The X.509v3 digital certificate may include extension fields that describe how the certification can be used. The extension fields include one or more criticality flags. In one embodiment the unrelated cryptographic folders contain an encrypted hash value.

The present invention also provides a method of providing confidentiality of authorization information in a digital certificate shared by multiple recipients. The method provides cryptographic folders in the digital certificate. At least one first type cryptographic folder contains at least one first type field of authorization information relevant to a first recipient. At least one second type cryptographic folder contains at least one second type field of authorization information relevant to a second recipient. The certificate authority issues the digital certificate by signing the digital certificate and sending the signed digital certificate to the subject. The subject then delivers the signed digital certificate to the first recipient. The at least one first type field of authorization information is readable by the first recipient. The at least one second type field of authorization information is not readable by the first recipient. The first recipient verifies the authenticity of the signed digital certificate.

The present invention further provides a method of signing a digital certificate at a certificate authority. The method provides cryptographic folders in the digital certificate having authorization information. The certificate authority closes all of the cryptographic folders in the digital certificate. A cryptographic hash of the digital certificate is computed with all folders closed. Digital certificate signature is computed with the computed cryptographic hash of the digital certificate and a private key of the certificate authority.

In one embodiment, a given cryptographic folder X is closed according to the present invention in the following manner. All of the nested folders in folder X are recursively closed. A cryptographic hash is computed of the contents of folder X including all recursively closed nested folders in folder X. The contents of folder X are replaced with the computed cryptographic hash of the contents of folder X. A flag is set in the header of folder X to indicate that folder X is closed.

The present invention also provides a method of delivering a digital certificate from a subject of the digital certificate to a recipient of the digital certificate. The method provides cryptographic folders in the digital certificate having authorization information. A digital certificate signature is transmitted from a certificate authority to the subject of the certificate. An unsigned copy of the digital certificate is transmitted from the certificate authority to the subject of the certificate. Any folders in the unsigned copy of the digital certificate that do not have authorization information relevant to the recipient are closed. The unsigned copy of the digital certificate and the digital certificate signature are transmitted from the subject of the digital certificate to the recipient.

In one embodiment of the present invention, the step of transmitting a copy of the unsigned digital certificate from the certificate authority to the subject of the certificate is performed over a secure delivery channel. In one embodiment, the secure delivery channel is protected via Internet Protocol Security (IPSEC). In another embodiment, the secure delivery channel is protected by Secure Sockets Layer (SSL).

The present invention further provides a method of verifying a signature for a digital certificate sent by a subject of the digital certificate to a recipient of the digital certificate. The method provides cryptographic folders in the digital certificate having authorization information. The recipient obtains a public key of the certificate authority corresponding to a private key used by the certificate authority to sign the digital certificate. The recipient closes any of the cryptographic folders left open in the digital certificate by the subject of the digital certificate. The recipient computes a cryptographic hash of the digital certificate. The recipient authenticates the signature for the digital certificate with the public key and the computed hash of the digital certificate.

The structured digital certificate and corresponding methods of employing the structural digital certificate according to the present invention offer several advantages over conventional digital certificates. A single structured digital certificate according to the present invention can be utilized for multiple, unrelated purposes and still provide recipient confidentiality protection without the added computational and network traffic overhead resulting from sending multiple digital certificates. The hierarchical structure of cryptographic folders utilized within the present invention makes it possible to disclose only those fields of the structured digital certificate that have to be inspected by the recipient for a given specific purpose. Since all but one folder of a structured digital certificate will typically be closed (i.e., contents of the folder replaced with a cryptographic hash), when the digital certificate is transmitted from the sender to the recipient over a network, the time taken to transmit the digital certificate over the network is reduced.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
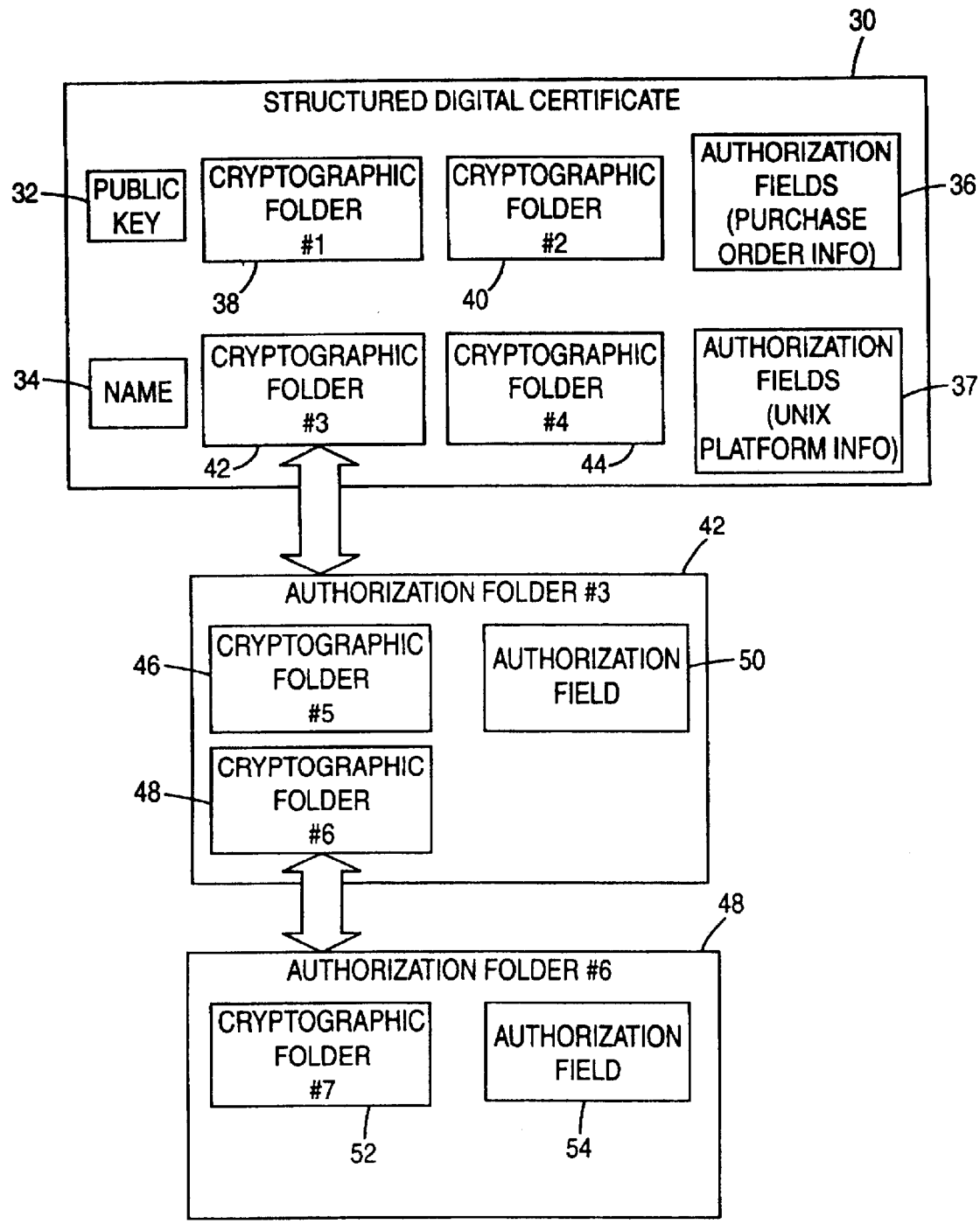
FIG. 1 is a block diagram of a structured digital certificate according to the present invention.

FIG. 1 is a block diagram of a structured digital certificate 30 according to the present invention. Structured digital certificate 30 is a data structure, digitally signed by an issuer (i.e., a certificate authority), that includes authorization information about another entity, referred to as a subject (i.e., a sender). The subject of structured digital certificate 30 presents the structured digital certificate to third parties who trust the issuer of structured digital certificate 30. The third parties are referred to as relying parties (i.e., recipients). The relying party computes a cryptographic hash of the structured digital certificate 30 and uses this hash, together with the public key of the issuer, which is readily available, to verify the digital signature of structured digital certificate 30.

In one embodiment, structured digital certificate 30 is a basic public key certificate and includes a public key 32 and a sender name 34 associated with the subject of structured digital certificate 30. In another embodiment, structured digital certificate 30 is an extended public key certificate and includes, in addition to public key 32 and sender name 34, additional fields 36, 37 and/or cryptographic folders 38, 40, 42 and 44 which contain authorization information. One example of an extended public key certificate is a X.509v3 certificate, previously described in the Background of the Invention section of the present specification.

In one embodiment, structured digital certificate 30 includes authorization fields 36 and 37 containing authorization information used for multiple, unrelated purposes. When structured digital certificate 30 is used for one specific purpose, it is desirable to hide the information contained in unrelated fields. One example structured digital certificate 30 can be used to grant access to a UNIX platform and to also grant permission to sign purchase orders. As a result, example structured digital certificate 30 has a first type authorization field 37 that specifies a user ID and a group ID for the UNIX platform, as well as a second type authorization field 36 that specifies a limit on the value of the purchase orders that the subject is authorized to sign. When example structured digital certificate 30 is used to access the UNIX platform, all authorization fields 36 and 37 of structured digital certificate 30 may become visible to the UNIX administrator, such as by being recorded on the system log. However, the UNIX administrator has no need to know the limit on the value of purchase orders as contained in second type authentication field 36. Thus, it is desirable to hide the information contained in second type authentication field 36 when the UNIX administrator examines structured digital certificate 30.

In one embodiment, an authorization field (or fields) is kept confidential by placing the authorization field in one of the cryptographic folders 38, 40, 42, and 44 and replacing the authorization information of the cryptographic folder with a cryptographic hash of the authorization information. This is accomplished without impairing the ability of the recipient of structured digital certificate 30 to verify the digital signature.

Cryptographic folders 38, 40, 42 and 44 are each a structured field, containing any number of nested fields. The nested fields can themselves be cryptographic folders. In the illustrated example, structured digital certificate 30 contains four cryptographic folders 38, 40, 42, and 44. Cryptographic folder 42 contains two additional cryptographic folders 46 and 48 along with authorization field 50. Cryptographic folder 48 contains one additional cryptographic folder 52 along with authorization field 54.

In one embodiment, cryptographic folders 38, 40, 42, 44, 46, 48, and 52 can be in one of two states, open or closed. The current state is indicated by a flag in the header of the cryptographic folder. In X.509v3 digital certificates, each extension (i.e., authorization) field has a criticality flag. The criticality flag is employed in situations where a recipient (i.e., relying party) is presented with one or more extension fields that it does not understand, perhaps because the extension is newer than the computer program used by the relying party. If the criticality flag is not set, the relying party can ignore the unknown extension. If the criticality flag is set, the relying party rejects structured digital certificate 30.

Cryptographic folders provide for increased flexibility in the use of criticality flags, but the interaction of cryptographic folders and criticality flags must be handled cautiously. An authorization field is defined recursively as being visible if it is not inside a cryptographic folder or if it is inside an open cryptographic folder which is itself visible. An application must reject a digital certificate if it contains a visible field where the criticality flag is set.

The issuer of the structure digital certificate 30 must ensure that a critical field is not placed inside an irrelevant cryptographic folder. Thus, if a critical field is relevant to a relying party, then, in the folder hierarchy, every cryptographic folder containing the authorization field must also be relevant to that relying party. These cryptographic folders must be open when the structured digital certificate 30 is presented to the relying party, and the critical authentication field must be visible.

Figure 2:
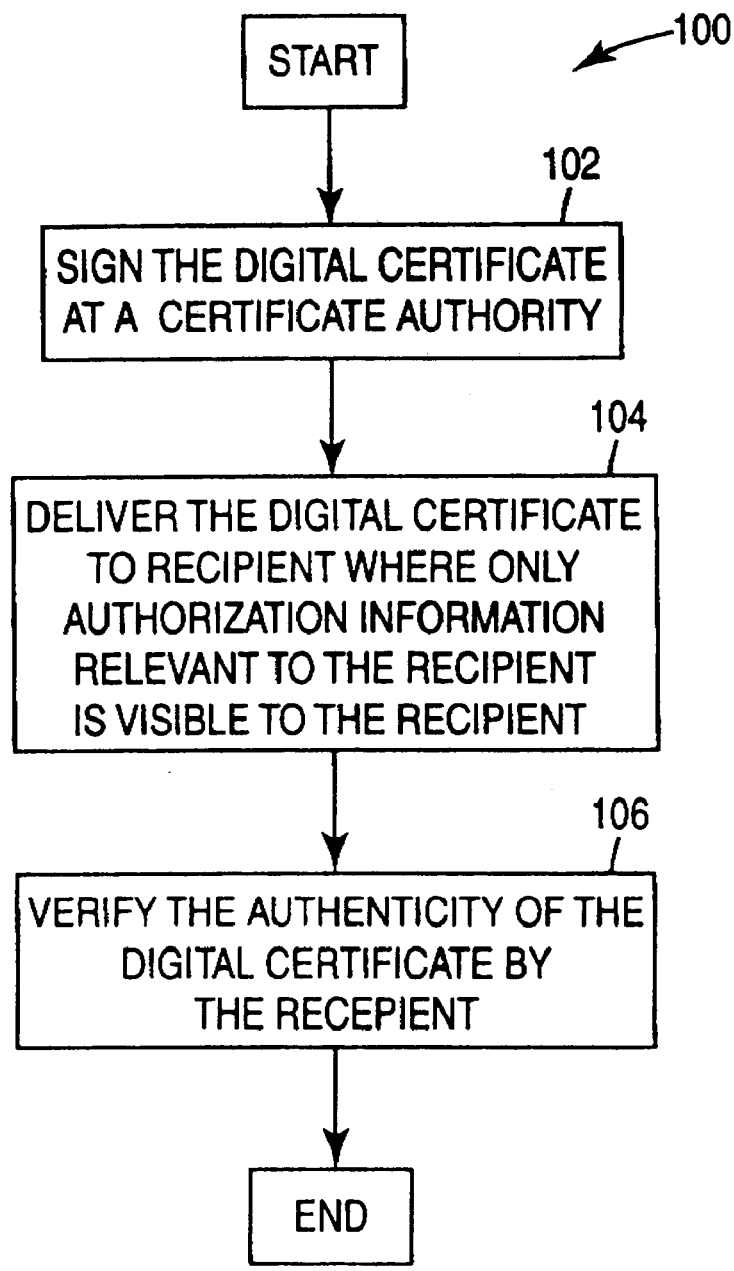
FIG. 2 is a flowchart illustrating a method of providing field confidentiality in digital certificates according to the present invention.

FIG. 2 is a flowchart of a method illustrated generally at 100 for providing field confidentiality in structured digital certificates, such as the structured digital certificate 30 illustrated in FIG. 1. At block 102, method 100 begins by signing structured digital certificate 30 at a certificate authority. The certificate authority (i.e., issuer) of structured digital certificate 30 closes all cryptographic folders within the structured digital certificate in order to generate a signature for the structured digital certificate. The method step indicated at block 102 for signing the structured digital certificate 30 is described in greater detail in reference to FIG. 3A.

After structured digital certificate 30 has been signed at block 102, the digital certificate signature and a copy of the digital certificate with at least one cryptographic open folder is delivered to the recipient via the subject of the digital certificate, as indicated at block 104. Only authorization information relevant to the recipient is visible to the recipient within the signed digital certificate (i.e., via open folders). The method step indicated at block 104 for delivering the structured digital certificate 30 to the recipient is described in greater detail in reference to FIG. 5.

Upon receipt of the signed structured digital certificate 30, the recipient verifies the authenticity of the signed digital certificate, as indicated at block 106. Before verifying the signed digital certificate, the recipient closes any cryptographic folders that are left open by the subject of the digital certificate. Thus, the relying party is able to perform the signature verification independently of the state of the cryptographic folders in the copy of the structured digital certificate presented by the subject. The method step indicated at block 106 for verifying the authenticity of the structured digital certificate 30 is described in greater detail in reference to FIG. 7.

Figure 3A:
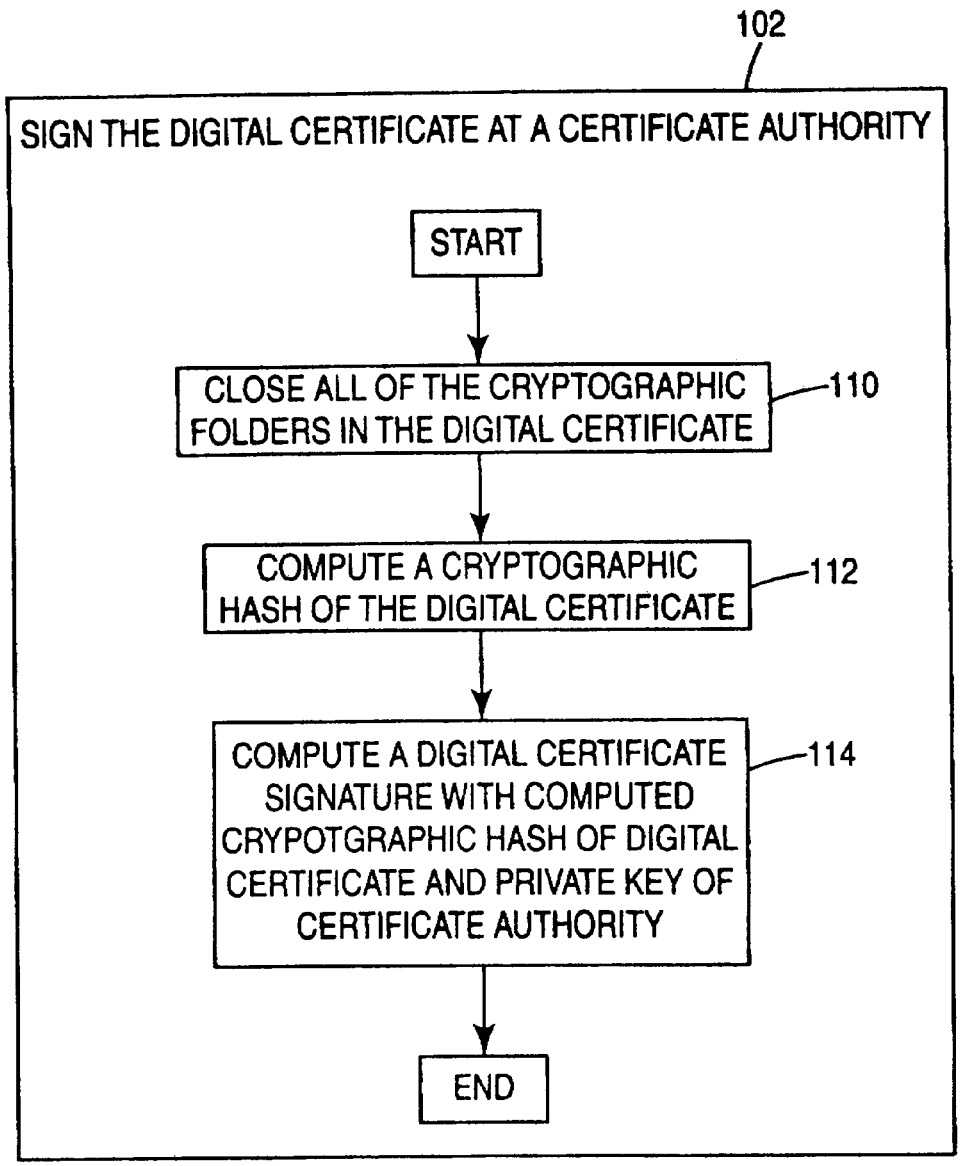
FIG. 3A is a flowchart illustrating a method of signing structured digital certificates at a certificate authority according to the present invention.

FIG. 3A is a flowchart illustrating one embodiment of a method 102 for signing structured digital certificates 30 at a certificate authority. As stated previously, before structured digital certificate 30 is signed or verified, any cryptographic folders present within structured digital certificate 30 are closed. Method 102 begins by closing all of the cryptographic folders in structured digital certificate 30, as indicated at block 110. Next, a cryptographic hash of the structured digital certificate 30 is computed, as indicated at block 112. The cryptographic hash can be computed by a variety of methods. In one embodiment, the cryptographic hash is computed by SHA-1. At block 114, the digital certificate signature is computed with the computed cryptographic hash of the digital certificate and a private key of the certificate authority.

Figure 3B:
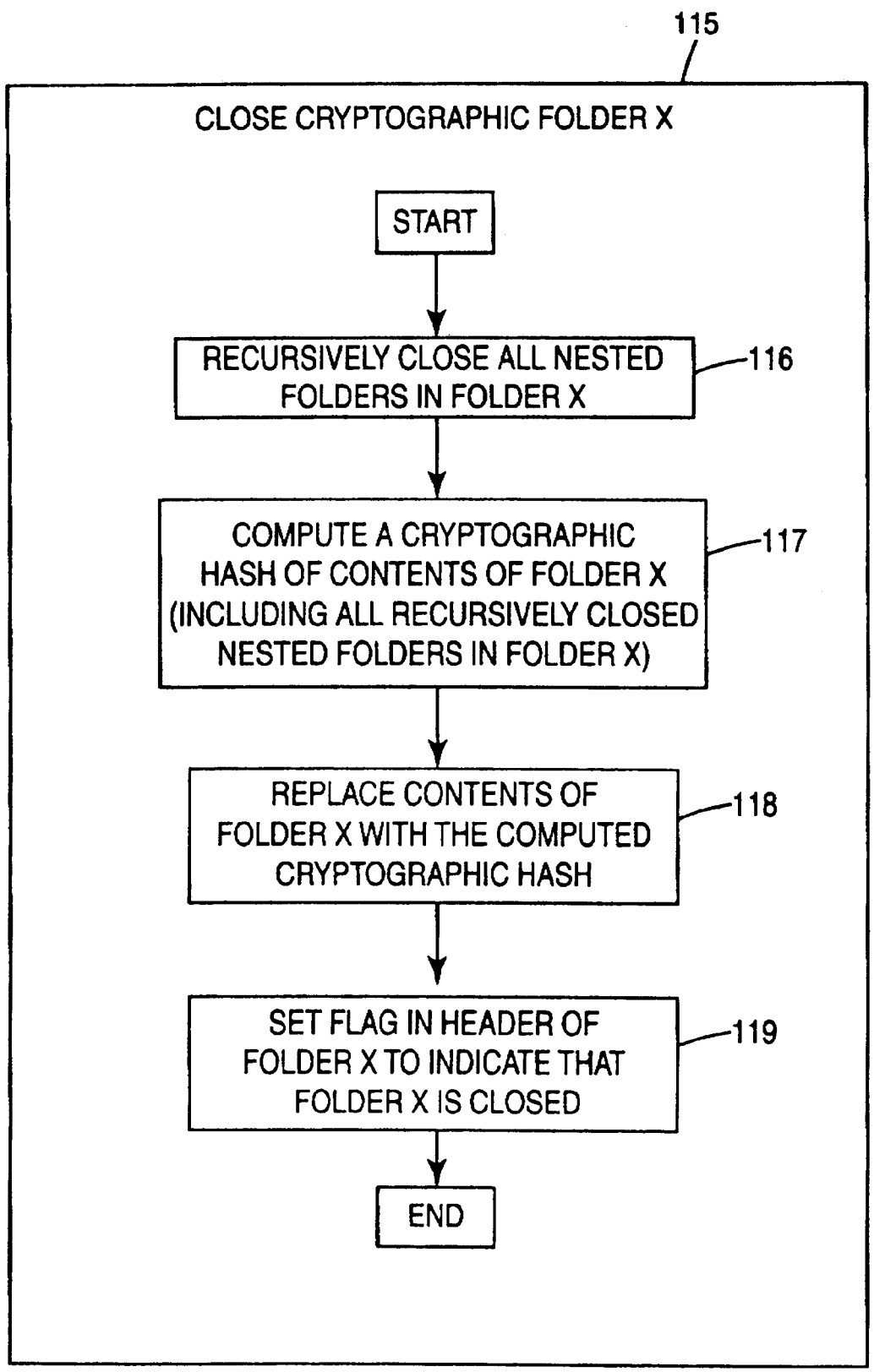
FIG. 3B is a flow chart illustrating a method of closing a given cryptographic folder X according to the present invention.

FIG. 3B is a flow chart illustrating one embodiment of a method 115 for closing a cryptographic folder X according to the present invention. As indicted at block 116, all of the nested folders in folder X are recursively closed. As indicated at block 117, a cryptographic hash is computed of the contents of folder X including all recursively closed nested folders in folder X. As indicated at block 118, the contents of folder X are replaced with the computed cryptographic hash of the contents of folder X. As indicated at block 119, a flag is set in the header of folder X to indicate that folder X is closed.

Figure 4:
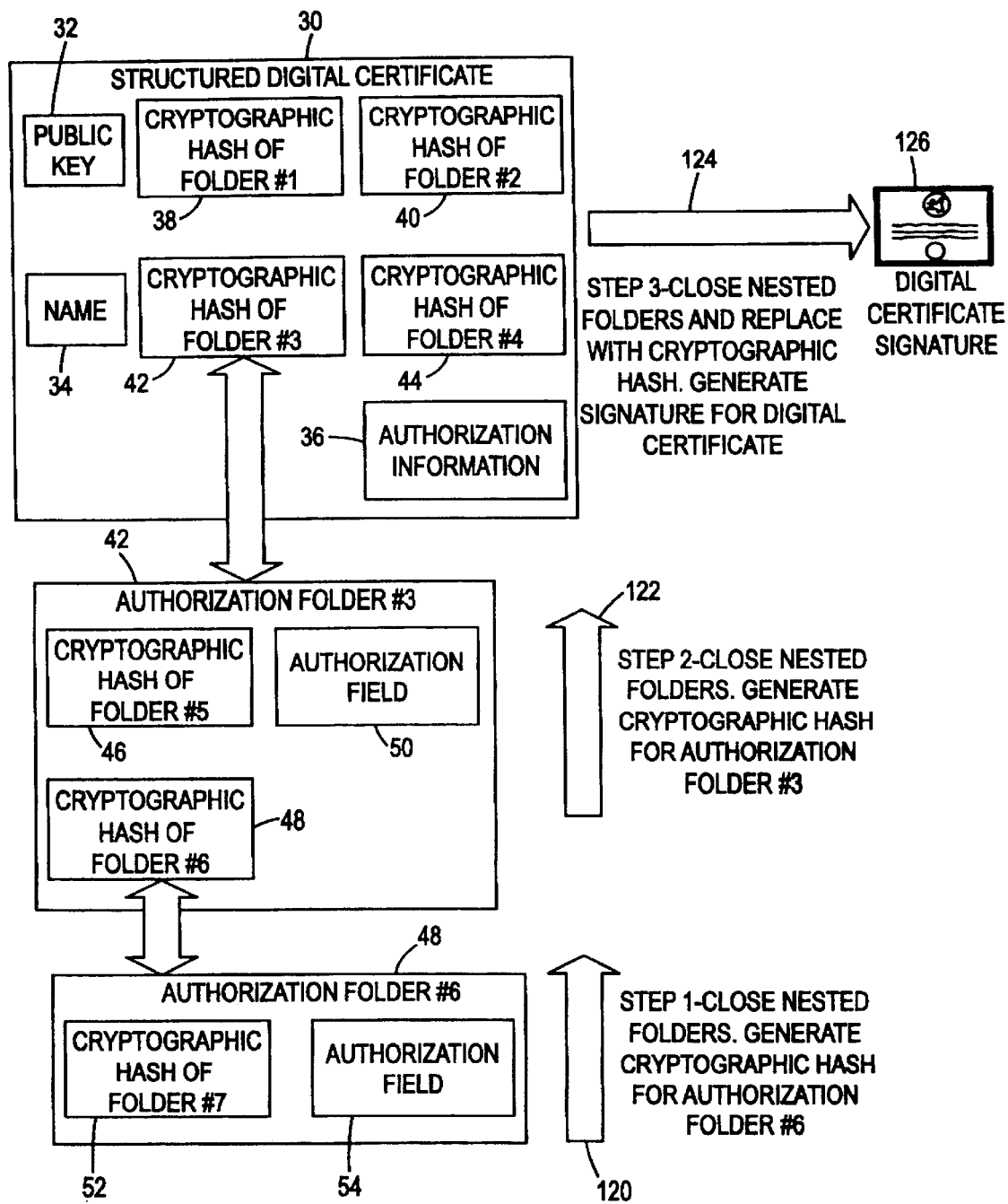
FIG. 4 is a block and data flow diagram illustrating how a signature is generated for a structured digital certificate at a certificate authority.

FIG. 4 is a block and data flow diagram illustrating an operation 118, where a signature is generated for structured digital certificate 30 at the certificate authority. As indicated at block 110 of FIG. 3A, all cryptographic folders within structured digital certificate 30 must be closed before a signature can be generated. In operation 118, the authorization information contents of open cryptographic folder 52 (i.e., the lowest level cryptographic folder within the hierarchy of cryptographic folders) is replaced with a cryptographic hash value, and cryptographic folder 52 is closed, as indicated at 120 in FIG. 4. Next, the authorization information contents of open cryptographic folders 46 and 48 are replaced with corresponding cryptographic hash values, and cryptographic folders 46 and 48 are closed, as indicated at 122. The authorization information contents of open top-level cryptographic folders 38, 40, 42, and 44 within structured digital certificate 30 are then replaced with corresponding cryptographic hash values, and cryptographic folders 38, 40, 42 and 44 are closed, as indicated at 124. At this point, the hierarchy of cryptographic folders within structured digital certificate 30 have been "flattened" such that a signature can be generated for the structured digital certificate 30, as indicated at 126.

Figure 5:
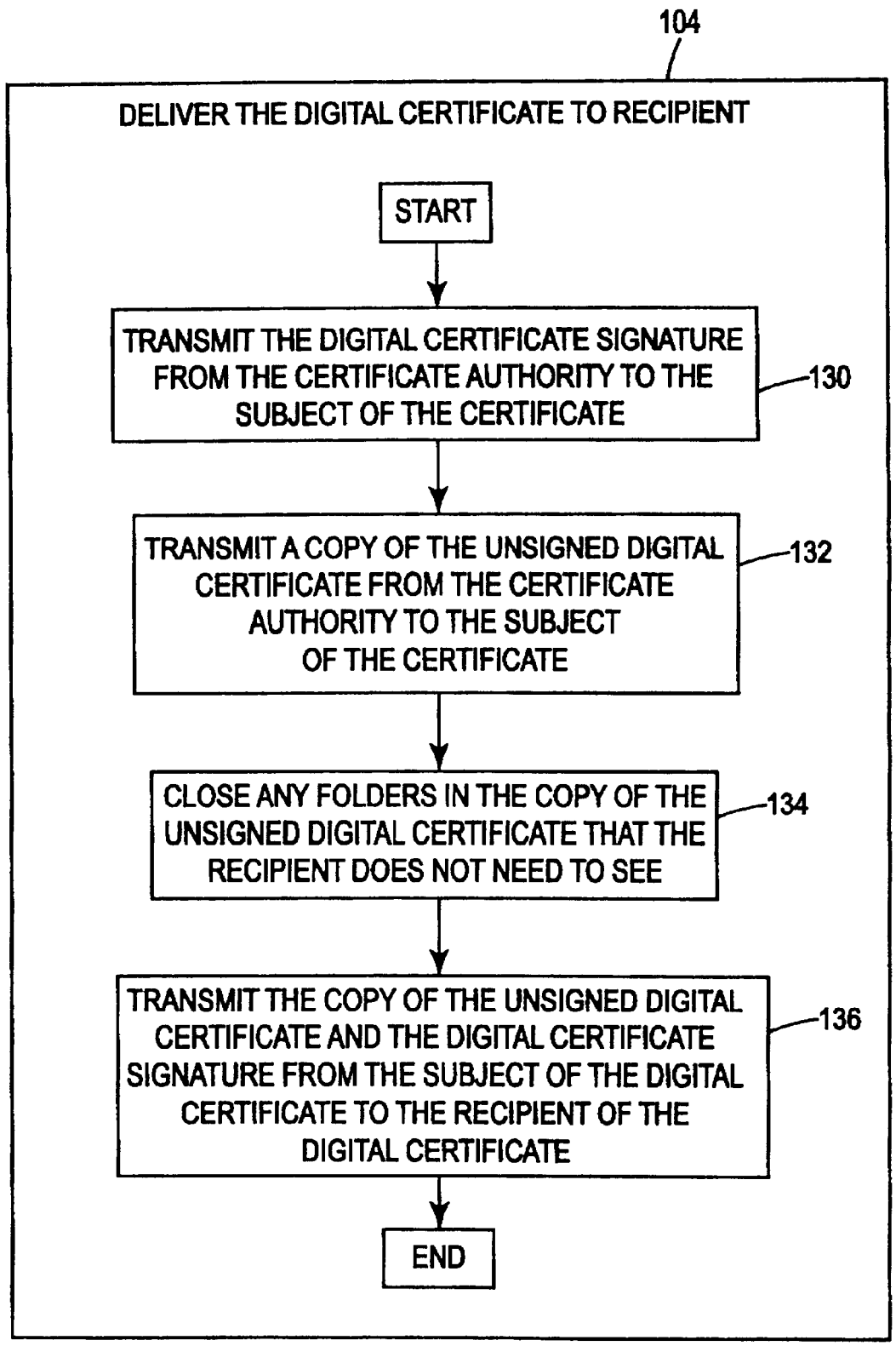
FIG. 5 is a flowchart illustrating a method of delivering a structured digital certificate and corresponding encrypted message to a message recipient according to the present invention.

FIG. 5 is a flowchart illustrating one embodiment of a method 104 for delivering structured digital certificate 30 to a recipient of the digital certificate. Method 104 begins by transmitting the digital certificate signature from the certificate authority (i.e., issuer) to the subject of the digital certificate, as indicated at block 130. At block 132, a copy of the unsigned digital certificate is transmitted from the certificate authority to the subject of the digital certificate. The subject of the digital certificate then closes any cryptographic folders in the copy of the unsigned digital certificate that the recipient does not need to see (i.e., folders do not contain authorization information relevant to the message recipient), as indicated at block 134. Finally the copy of the unsigned digital certificate and the digital certificate signature generated by the certificate authority are transmitted from the subject of the digital certificate to the recipient of the digital certificate, as indicated at block 136.

Figure 6:
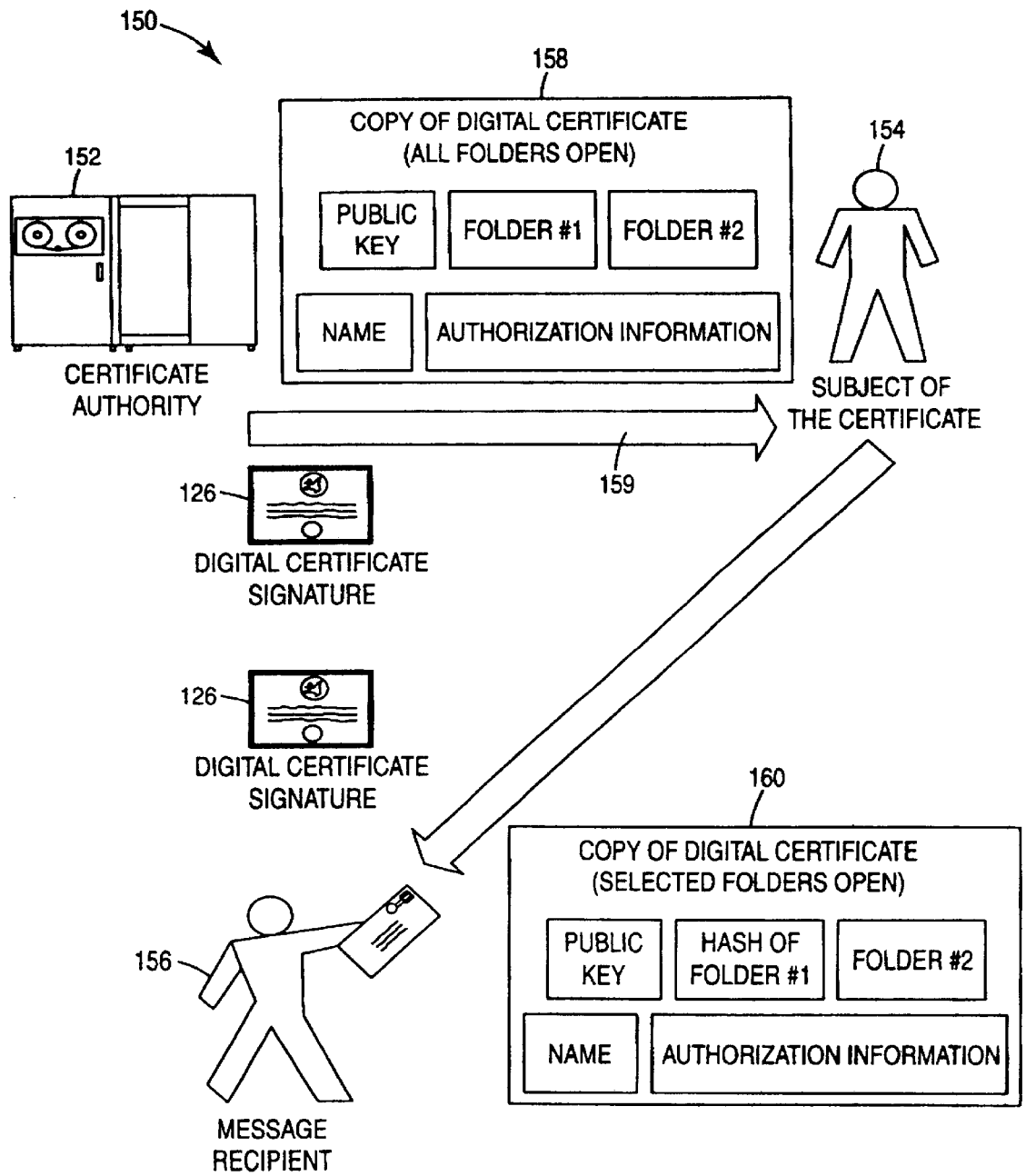
FIG. 6 is a block and data flow diagram illustrating how a structured digital certificate is delivered to a message recipient from a certificate authority, via the subject of the certificate.

FIG. 6 is a block and data flow diagram illustrating an operation 150 where a structured digital certificate signed by a certificate authority is delivered to a recipient, via the subject of the certificate. As described previously, certificate authority 152 closes all of the cryptographic folders within structured digital certificate 30 before signing structured digital certificate 30. After the structured digital certificate has been signed, digital certificate signature 126 is delivered to a subject 154 of the digital certificate. In addition to the digital certificate signature 126, certificate authority 152 also delivers a copy of the structured digital certificate 158 where all of the cryptographic folders are open to the subject 154 of the digital certificate. If the copy of the structured digital certificate 158 contains sensitive information, then it becomes necessary to provide security to a delivery channel 159 between certificate authority 152 and the subject 154 of the certificate. In one embodiment, delivery channel 159 is secured by Internet Protocol Security (IPSEC). In an alternate embodiment, delivery channel 159 is secured by Secure Sockets Layer (SSL).

Subject 154 of the digital certificate forwards the digital certificate signature 126 to recipient 156. Before submitting the copy of the structured digital certificate 158 to recipient 156, subject 154 of the digital certificate closes any cryptographic folders that recipient 156 does not need to see, as indicated at 160.

Figure 7:
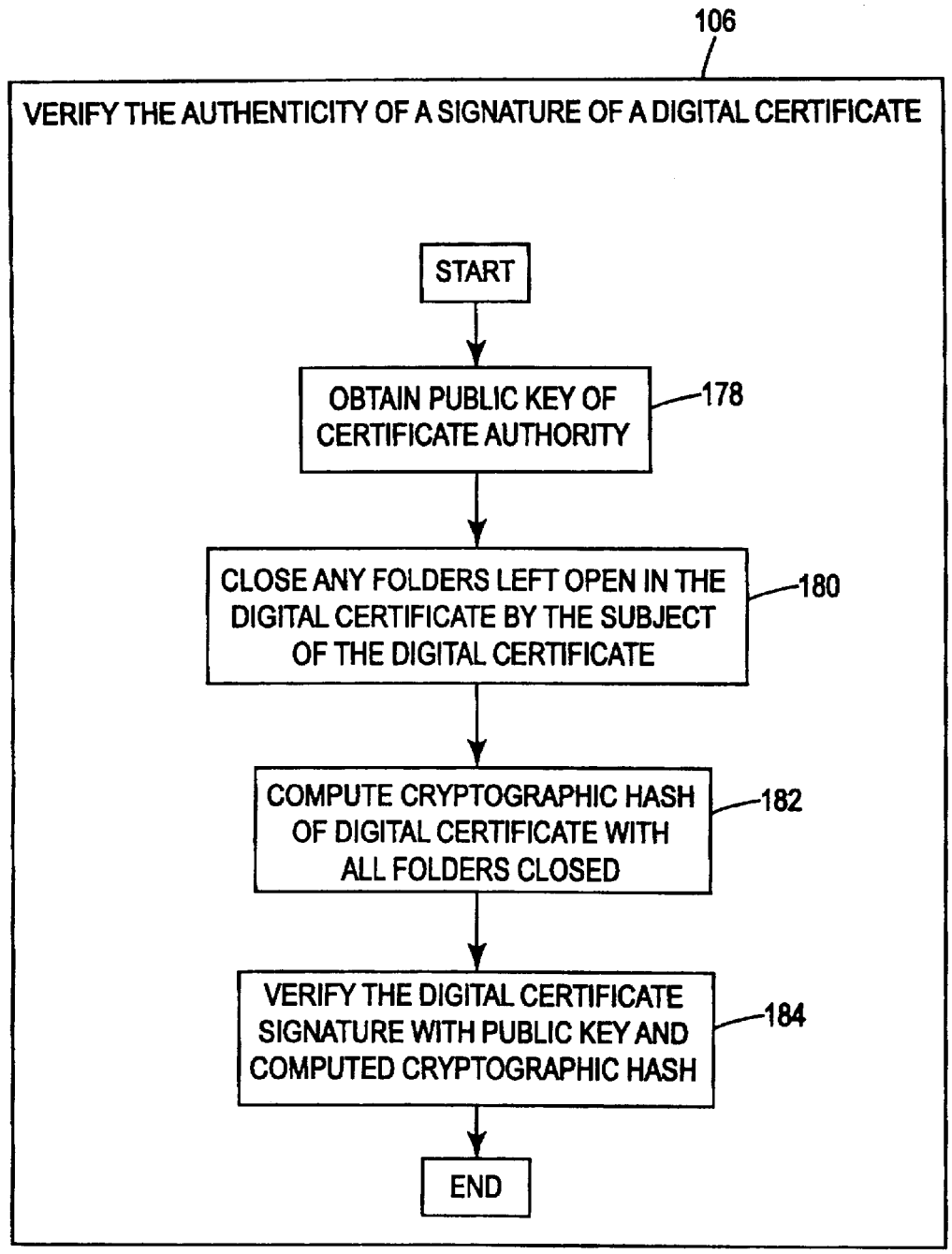
FIG. 7 is a flowchart illustrating a method of verifying the authenticity of a signature of a structured digital certificate according to the present invention.

FIG. 7 is a flowchart illustrating one embodiment of a method 106 for verifying the authenticity of a signature of a structured digital certificate 30. In method 106, recipient 156 obtains a public key of the certificate authority 152 corresponding to a private key used by the certificate authority to sign the digital certificate, which is made readily available by certificate authority 152, as indicated at block 178. Method 106 closes any cryptographic folders left open in the copy of the structured digital certificate by subject 154 of the digital certificate, as indicated at block 180. As indicated at block 182, recipient 156 computes a cryptographic hash of the structured digital certificate 158 with all folders closed. As indicated at block 184, recipient 156 verifies the signature for the digital certificate with the public key and the computed cryptographic hash of the digital certificate.

Figure 8:
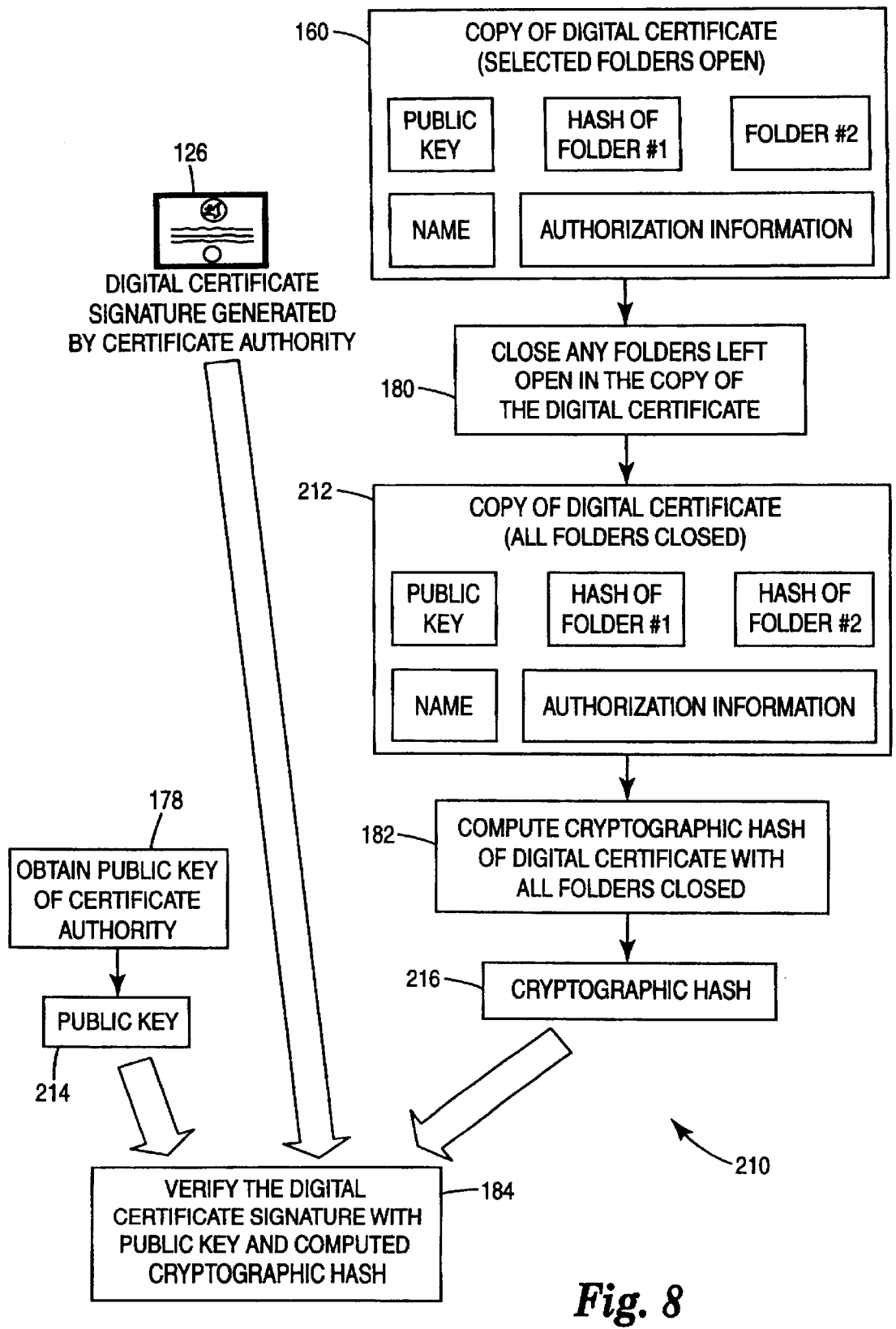
FIG. 8 is a block and data flow diagram illustrating how a message recipient verifies the authenticity of a structured digital certificate according to the present invention.

FIG. 8 is a block and data flow diagram illustrating an operation 210 where a message recipient verifies the authenticity of a structured digital certificate. In operation 210, recipient 156 obtains a public key 214 of the certificate authority 152, as indicated at 178. Before verifying signed digital certificate 126, recipient 156 closes all cryptographic folders that were left open by the subject 154 of the certificate 154 in the copy of the digital certificate 160, as indicated at block 180. As indicated at block 182, recipient 156 computes a cryptographic hash 216 of the digital certificate 212 having all cryptographic folders closed. As indicated at block 184, recipient 156 verifies the signature of the digital certificate 126 with the public key 214 and the computed cryptographic hash 216 of the digital certificate.

Figure 9:
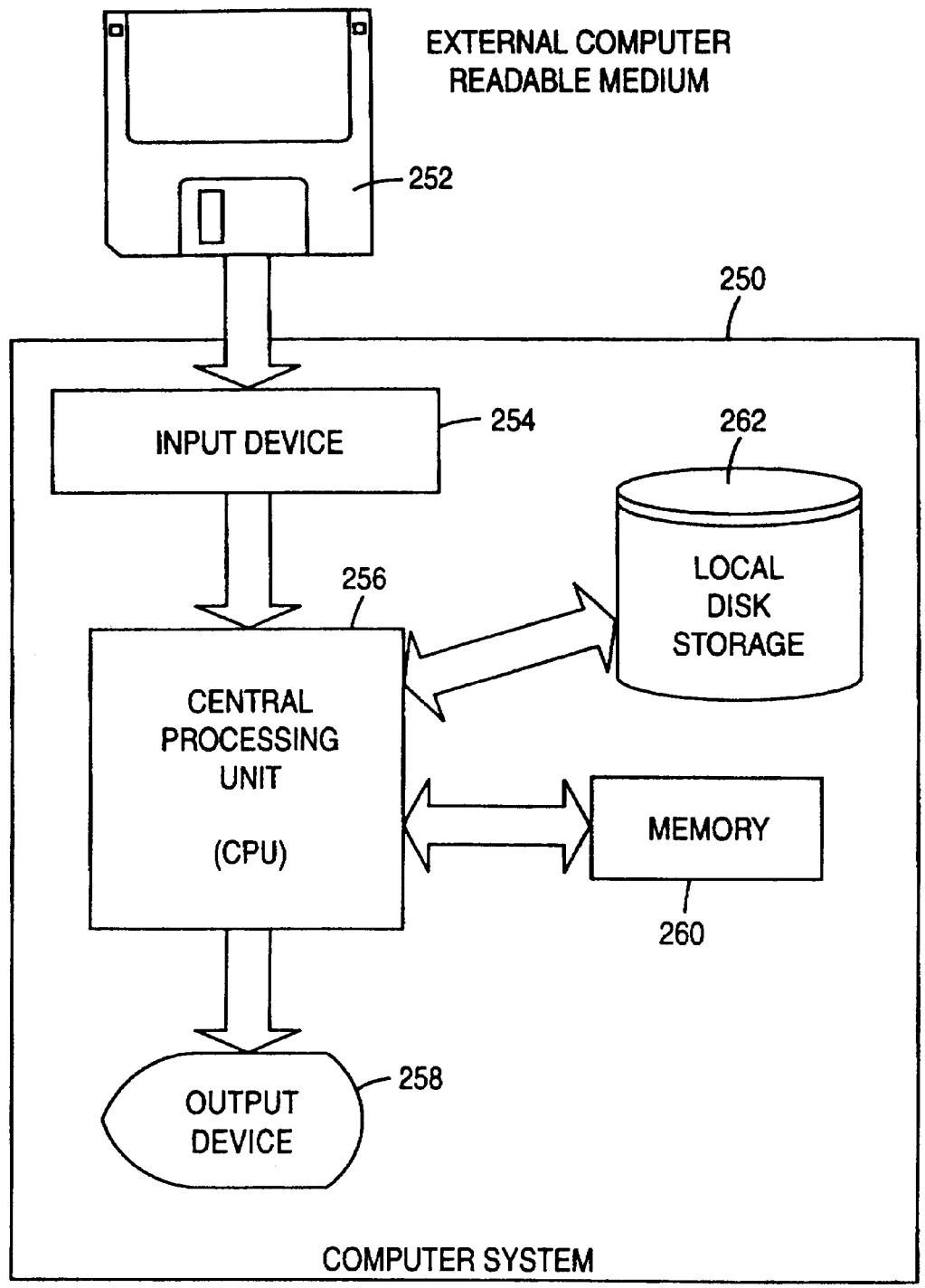
FIG. 9 is a block diagram of a computer system and a corresponding computer readable medium incorporating a function for providing field confidentiality in digital certificates.

FIG. 9 illustrates one embodiment of a computer system 250 and an external computer readable medium 252 which can be employed according to the present invention to provide field confidentiality in digital certificates at a certificate authority to incorporate a method of signing a digital certificate; at a subject of the digital certificate to incorporate a method of delivering the digital certificate from the subject to a recipient of the digital certificate; or at the recipient of the digital certificate to incorporate a method of verifying a signature for the digital certificate. Embodiments of external computer readable medium 252 include, but are not limited to: a CD-ROM, a floppy disk, and a disk cartridge. Any one of the above methods for providing field confidentiality in digital certificates of the present invention can be implemented in a variety of compiled and interpreted computer languages. External computer readable medium 252 stores source code, object code, executable code, shell scripts and/or dynamic link libraries for any one of the above methods for providing field confidentiality in digital certificates. An input device 254 reads external computer readable medium 252 and provides this data to computer system 250. Embodiments of input device 254 include but are not limited to: a CD-ROM reader, a floppy disk drive, and a data cartridge reader.

Computer system 250 includes a central processing unit 256 for executing any one of the above methods for providing field confidentiality in digital certificates according to the present invention. Computer system 250 also includes local disk storage 262 for locally storing any one of the above methods for providing field confidentiality in digital certificates before, during and after execution. Any one of the above methods for providing field confidentiality in digital certificates also utilizes memory 260 within the computer system during execution. Upon execution of any one of the above methods for providing field confidentiality in digital certificates, output data is produced and directed to an output device 258. Embodiments of output device 258 include, but are not limited to: a computer display device, a printer, and/or a disk storage device.

The present invention provides a method by which the subject (i.e., sender) of a digital certificate can keep certain fields within the digital certificate confidential as the sender presents the digital certificate to a relying party (i.e., recipient). The present invention accomplishes this specific field confidentiality through a structured digital certificate which includes a hierarchical structure of cryptographic folders. In addition to providing field confidentiality, the present invention improves the speed of signature verification by the receiving party, reduces network traffic, and reduces computational overhead.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the electrical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of providing confidentiality of authorization information in a digital certificate shared by multiple recipients, the method comprising the steps of:

providing cryptographic folders in the digital certificate, wherein at least one first type cryptographic folder contains at least one first type field of authorization information relevant to a first recipient and at least one second type cryptographic folder contains at least one second type field of authorization information relevant to a second recipient;

issuing the digital certificate at a certificate authority by signing the digital certificate and sending the signed digital certificate to a subject, wherein the issued digital certificate is in an unprotected form wherein the at least one first type and the at least one second type fields of authorization information are readable;

converting the digital certificate from the unprotected form to a protected form wherein the at least one first type field of authorization information is readable and the at least one second type field of authorization information is not readable;

delivering the converted signed digital certificate to the first recipient; and verifying the authenticity of the signed digital certificate by the first recipient.

2. The method of claim 1 wherein the step of signing the digital certificate at a certificate authority comprises the steps of:
   closing all of the cryptographic folders in the digital certificate;
   computing a cryptographic hash of the digital certificate; and
   computing a digital certificate signature with computed cryptographic hash of the digital certificate and a private key of the certificate authority.

3. The method of claim 1 wherein the step of converting the signed digital certificate from the unprotected form to the protected form includes:
   closing any cryptographic folders in a copy of the issued unprotected digital certificate that do not have at least one first type field of authorization information.

4. The method of claim 1 wherein the step of verifying the authenticity of the digital certificate by the first recipient includes:
   obtaining a public key from the certificate authority;
   closing any cryptographic folders left open in the unsigned digital certificate;
   computing a cryptographic hash of the unsigned digital certificate with all folders closed; and
   verifying the signature of the digital certificate with the public key and the computed cryptographic hash of the unsigned digital certificate.

5. A method of signing a digital certificate at a certificate authority, the method comprising the steps of:
   providing cryptographic folders in the digital certificate having authorization information;
   closing all of the cryptographic folders in the digital certificate;
   computing a cryptographic hash of the digital certificate; and
   computing a digital certificate signature with the computed cryptographic hash of the digital certificate and a private key of the certificate authority.

6. The method of claim 5 wherein the step of closing all of the cryptographic folders in the digital certificate includes closing a cryptographic folder X according to the following steps:
   recursively closing all nested folders in folder X;
   computing the cryptographic hash of the contents of folder X;
   replacing the contents of folder X with the computed cryptographic hash of the contents of folder X; and
   setting a flag in a header of folder X to indicate that folder X is closed.

7. A method of delivering a digital certificate from a subject of the digital certificate to a recipient of the digital certificate, the method comprising the steps of:
   providing cryptographic folders in the digital certificate having authorization information;
   transmitting a digital certificate signature from a certificate authority to the subject of the certificate;
   transmitting an unsigned copy of the digital certificate from the certificate authority to the subject of the certificate;
   closing any folders in the unsigned copy of the digital certificate that do not have authorization information relevant to the recipient; and
   transmitting the unsigned copy of the digital certificate and the digital certificate signature from the subject of the digital certificate to the recipient.

8. The method of claim 7 wherein the step of transmitting the unsigned copy of the digital certificate from the certificate authority to the subject of the certificate is performed over a secure delivery channel.

9. The method of claim 8 wherein the secure delivery channel is protected via Internet Protocol Security (IPSEC).

10. The method of claim 8 wherein the secure delivery channel is protected by Secure Sockets Layer (SSL).

11. A method of verifying a signature for a digital certificate sent by a subject of the digital certificate to a recipient of the digital certificate, the method comprising the steps of:
    providing cryptographic folders in the digital certificate having authorization information;
    obtaining a public key of the certificate authority corresponding to a private key used by the certificate authority to sign the digital certificate;
    closing any of the cryptographic folders left open in the digital certificate by the subject of the digital certificate;
    computing a cryptographic hash of the digital certificate with all cryptographic folders closed; and
    verifying the signature for the digital certificate with the public key and the computed cryptographic hash of the digital certificate.

12. A computer readable medium containing instructions for controlling a computer system to perform a method of signing a digital certificate at a certificate authority, the method comprising the steps of:
    providing cryptographic folders in the digital certificate having authorization information;
    closing all of the cryptographic folders in the digital certificate;
    computing a cryptographic hash of the digital certificate; and
    computing a digital certificate signature with the computed cryptographic hash of the digital certificate and a private key of the certificate authority.

13. A computer readable medium containing instructions for controlling a computer system to perform a method of delivering a digital certificate from a subject of the digital certificate to a recipient of the digital certificate, the method comprising the steps of:
    providing cryptographic folders in the digital certificate having authorization information;
    transmitting a digital certificate signature from a certificate authority to the subject of the certificate;
    transmitting an unsigned copy of the digital certificate from the certificate authority to the subject of the certificate;
    closing any folders in the unsigned copy of the digital certificate that do not have authorization information relevant to the recipient; and
    transmitting the unsigned copy of the digital certificate and the digital certificate signature from the subject of the digital certificate to the recipient.

14. A computer readable medium containing instructions for controlling a computer system to perform a method of verifying a signature for a digital certificate sent by a subject of the digital certificate to a recipient of the digital certificate, the method comprising the steps of:
    providing cryptographic folders in the digital certificate having authorization information;

obtaining a public key of the certificate authority corresponding to a private key used by the certificate authority to sign the digital certificate;

closing any of the cryptographic folders left open in the digital certificate by the subject of the digital certificate;

computing a cryptographic hash of the digital certificate with all cryptographic folders closed; and verifying the signature for the digital certificate with the public key and the computed cryptographic hash of the digital certificate.

15. A structured digital certificate adapted to be certified by a digital signature of a certificate authority in an unprotected form, a first protected form, and a second protected form of the digital certificate, the digital certificate comprising:

a first type field of authorization information relevant to a first recipient and being readable in the unprotected form and the first protected form of the digital certificate; and a first cryptographic folder containing a second type field of authorization information relevant to a second recipient and being readable in the unprotected form and the second protected form of the digital certificate, but not readable in the first protected form of the digital certificate;

wherein the digital certificate is configured to permit the subject to convert the structured digital certificate from the unprotected form to at least one of the first protected form and the second protected form;

wherein the digital certificate is convertible into the first protected form to permit the first recipient to authorize the subject of the structured digital certificate; and wherein the digital certificate is convertible into the second protected form to permit the second recipient to authorize the subject of the structured digital certificate.

16. The structured digital certificate of claim 15, further comprising:

a second cryptographic folder containing a plurality of nested fields and/or folders.

17. The structured digital certificate of claim 15, wherein the digital certificate further comprises:

a subject name.

18. The structured digital certificate of claim 15, wherein the digital certificate further comprises:

a public key associated with the subject.

19. The structured digital certificate of claim 15, wherein the first type field of authorization information is contained outside of any cryptographic folder.

20. The structured digital certificate of claim 15, comprising:

a second cryptographic folder containing the first type field of authorization information.

21. The structured digital certificate of claim 15, wherein the digital certificate configured in the unprotected form includes the first cryptographic folder, wherein the first cryptographic folder contains an encrypted hash value based at least partially on the second type field of authorization information.

22. A method of providing confidentiality of authorization information in a digital certificate, the method comprising:

providing, in an unprotected form of the digital certificate, at least one first type field of authorization information relevant to a first recipient and at least one second type field of authorization information relevant to a second recipient;

providing at least one cryptographic folder in the digital certificate, wherein the at least one cryptographic folder includes a first cryptographic folder containing at least one second type field of authorization information relevant to a second recipient;

issuing the digital certificate at a certificate authority by protecting from read access the at least one first type and the at least one second type fields with a one-way protection algorithm, generating a digital signature based on the protected fields and sending the digital signature and the unprotected form of the digital certificate to a subject;

preventing read access to the at least one second type field of the digital certificate using the one-way protection algorithm;

delivering to the first recipient the digital signature and the digital certificate having the at least one second type field prevented from read access, wherein the at least one first type field of authorization information is readable by the first recipient, and the at least one second type field of authorization information is not readable by the first recipient; and verifying the authenticity of the digital certificate by the first recipient.

23. The method of claim 22, wherein the preventing read access is performed at the subject, and wherein the delivering to the first recipient is from the subject.

24. The method of claim 22, and further comprising:

preventing read access to the at least one first type field of the digital certificate using the one way protection algorithm;

delivering the digital signature and the digital certificate having the at least one first type field prevented from read access, wherein the at least one second type field of authorization information is readable by the second recipient, and the at least one first type field of authorization information is not readable by the second recipient; and verifying the authenticity of the digital certificate by the second recipient.

25. The method of claim 22, wherein the generating of the signature for the digital certificate at the certificate authority further comprises:

closing all of the cryptographic folders in the digital certificate;

computing a cryptographic hash of the digital certificate; and computing a digital signature with the computed cryptographic hash of the digital certificate.

26. The method of claim 22, wherein the preventing read access to a field includes closing any cryptographic folders that do not have at least one type field of authorization information that is not to be prevented from read access.

27. A system for enabling certified authorization of a subject by multiple relying parties, the system comprising:

a subject;

a first relying party and a second relying party;

a trusted certificate authority; and a structured digital certificate including:

a first type field of authorization information relevant to the first relying party and being readable in an unprotected form and a first protected form of the digital certificate;

a first cryptographic folder containing a second type field of authorization information relevant to the second relying party and being readable in the unprotected form and a second protected form of the digital certificate, but not readable in the first protected form of the digital certificate; and a certification by the certificate authority that certifies the digital certificate in the unprotected form and in the first and second protected forms;

wherein the digital certificate is convertible, after issuance, from the unprotected form to at least one of the first protected form and the second protected form, wherein in the first protected form, the digital certificate permits the first relying party to authorize the subject and in the second protected form, the digital certificate permits the second relying party to authorize the subject.

* * * * *